Oct. 27, 1959

M. R. NIELSEN

2,910,159

CLUTCH MECHANISM

Filed April 22, 1955

Inventor:
Milton R. Nielsen
By: Donald W. Banner Atty.

Oct. 27, 1959    M. R. NIELSEN    2,910,159
CLUTCH MECHANISM
Filed April 22, 1955    4 Sheets-Sheet 4

Inventor:
Milton R. Nielsen
By:
Donald W. Banner  Atty.

United States Patent Office 2,910,159
Patented Oct. 27, 1959

2,910,159

CLUTCH MECHANISM

Milton R. Nielsen, Lombard, Ill., assignor to Borg-Warner Corporation, Chicago, Ill., a corporation of Illinois Application April 22, 1955, Serial No. 503,268

8 Claims. (Cl. 192—45.1)

This invention relates to one-way engaging devices of the sprag or tiltable gripper type, and more particularly to one-way engaging devices having means for controlling the relationship between the sprags and the race surfaces.

It is found in many applications employing one-way engaging devices of the sprag type that it is desirable to control the devices in such a way that the sprags, interposed between coaxial and cylindrical race surfaces, are positionable with respect to those race surfaces as desired. More specifically, one-way engaging devices of the sprag type are conventionally provided with sprag energizing means, such as springs, which bias the sprags toward a position of engagement with respect to both the race surfaces. The sprag configuration is such that upon relative rotation between the race surfaces in a predetermined direction, the sprags will instantly engage both the race surfaces so that the proposed surfaces are wedged together by means of the sprags. Conversely, when the races rotate in the opposite relative direction, the wedging engagement of the sprags with the race surfaces is broken so that the races may freely rotate in this direction, the sprags slidably engaging the race surfaces; this is sometimes referred to as the overrunning condition of the unit.

It is manifestly advantageous to provide, in certain circumstances, means for eliminating drag of the sprags along the race surfaces during this overrunning condition, particularly when the races rotate relatively in such overrunning conditions at high speeds. This invention provides, in part, for such means by which the sprags may be lifted free from engagement with at least one of the race surfaces normally engaged thereby, despite the biasing effect of the springs normally employed. In addition, the present invention further provides for lifting the sprags free of engagement with at least one of the race surfaces to such an extent that the races may be rotated relatively freely in either direction, without reference to the normal engaging position of the sprags, so that the device may overrun in either such relative direction of race rotation. Furthermore, the device of the present invention provides for maintaining the sprags in such a position for as long a period as is desired and without in any way being related to the speed of rotation of the unit, or any part thereof.

It is frequently the case that the sprags employed in the one-way engaging device are of such nature that during the overrunning condition of the device the effect of centrifugal force acting upon the sprags is to tilt the sprags in such a manner, relative to the races, that the sprags disengage one of the races. It has been found to be advantageous in some of these circumstances to provide for forcing the sprags into a position in which they remain in engagement with both of the race surfaces during the overrunning condition of the unit despite the aforementioned effect of centrifugal force. The device of the present invention provides for advantageously accomplishing the foregoing purpose, and is particularly constructed in such a manner that although the sprags may be permitted to lift off any one of the races during such overrunning conditions, so that wear is minimized, the sprags can nevertheless be forced to return into engagement with both of the races upon actuation of the device of the present invention so that the sprags will thereby be in condition to wedgingly engage between the race surfaces immediately upon reversal of the relative direction of rotation therebetween.

It is, therefore, one object of the present invention to provide a device having the aforementioned advantages.

Another object is the provision of a device in accordance with the preceding object in which simple and inexpensive means are provided to achieve such advantages.

Another object of the present invention is the provision of a device in accordance with the preceding objects in which the actuating force operating the means for achieving such advantages may be either mechanical, electrical, hydraulic or otherwise.

Another object of the present invention is the provision of a device in accordance with the preceding objects in which a plurality of circumferentially spaced sprags or gripping elements are provided between generally cylindrical race surfaces, the sprags extending through a pair of spaced and relatively rotatable cages, means being provided to rotate the cages relatively to each other at will to thereby control the position of the sprags.

Another object of the present invention is the provision of a device in accordance with the preceding objects in which the relationship between the sprags and the cage openings through which the sprags extend is such that the sprags remain in engagement with the circumferentially spaced sides of the openings throughout the sprag tilting range.

Another object of the present invention is the provision of a device in accordance with the preceding objects in which cam means are provided which are adapted to effect the relative rotation between the cages to achieve the desired sprag positioning.

Another object of the present invention is the provision of a device in accordance with the preceding objects in which cam means are provided which are spaced axially from the cages and are movable relative thereto to effect relative rotation between the cages and consequent desired positioning of the sprags.

Another object of the present invention is the provision of a device in accordance with the preceding objects in which cam means are provided which are spaced axially from the cages but engage portions thereof, said cam means being rotatable relative to the cages to effect relative rotation thereof and the desired positioning of the sprags.

Another object of the present invention is the provision of a device in accordance with the preceding objects in which cam means are provided which move radially relative to the cage means and thereby engage said cage means to effect a relative movement therebetween.

Another object of the present invention is the provision of a device in accordance with the preceding objects in which cam means are provided which are disposed in engagement with one of a pair of relative rotatable cages, and which are movable to engage the other of the cages to effect relative movement of the cages and consequent desired positioning of the sprags.

Other objects and features of the invention will be readily apparent to those skilled in the art from the specification and appended drawings illustrating certain preferred embodiments in which.

Figures 1, 7:
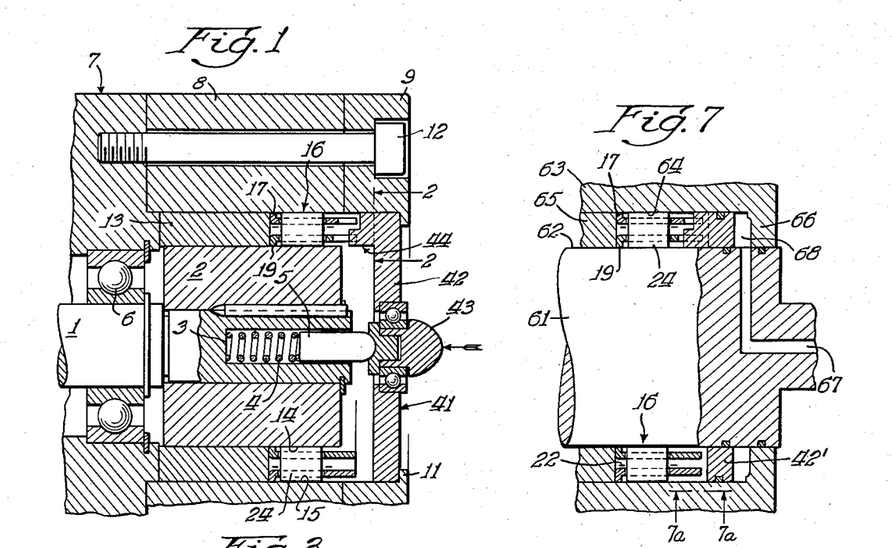
Figure 1 is a side elevational view, partially in section, illustrating a first embodiment of the present invention.
Figure 7 is a view similar to Figure 1 illustrating a second modified form of my invention.

Turning now to a consideration of one form of my invention as illustrated in Figures 1 through 5, there is shown therein an inner shaft 1 to one end of which is fixedly mounted an inner race member 2. The race member 2 is generally cylindrical in shape and has an outer, smooth circular periphery against which the one-way clutch, to be subsequently described, is disposed. Centrally of the inner race member 2 there is provided an opening 3 within which there is a compression spring 4, one end of which is disposed in engagement with the bottom surface of the opening 3 while the other end of the spring 4 engages the plunger 5, slidably disposed within the opening 3, which operates in a manner to be more fully explained subsequently. Disposed upon the shaft 1 are suitable bearing means 6, the outer surfaces of which are disposed in engagement with an outer race member assembly, indicated in general by the numeral 7. This outer race member assembly comprises an outer race 8 having an inner, cylindrical surface against which the sprag clutch employed in the present invention is adapted to be disposed, as will be more fully explained hereinafter. The assembly 7 further comprises a circular cap member 9 having a radially inwardly extending ledge 11. Suitable fastening means, such as bolts 12, serve to maintain the members of the assembly 7 in cooperative relation. Disposed between the inner race 2 and the outer race 8 is a spacing collar or bearing 13 of generally ring shape, the inner end of the collar 13 engaging the assembly 7, as illustrated in Figure 1; the radially inner surface of the collar 13 is disposed in engagement with the outer annular surface of the inner race 2; the radially outer annular surface of the collar 13 is disposed in engagement with the inner annular surface of the outer race 8.

Disposed adjacent the collar 13 and between the outer annular surface of the inner race 2—to which the numeral 14 has been applied—and the inner annular surface of the outer race 8—to which the numeral 15 has been applied—there is disposed a sprag type one-way engaging device indicated in general by the numeral 16.

Figure 2:
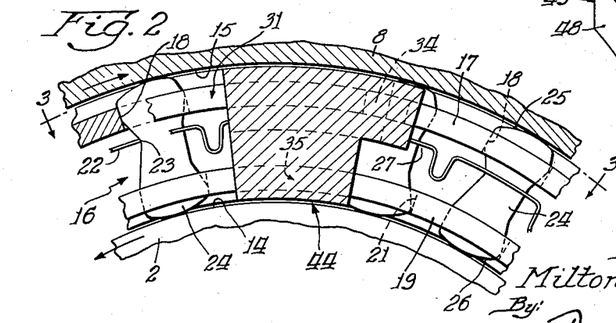
Figure 2 is a partial, enlarged front view of the device of the present invention illustrated in Figure 1, and taken from a position 90 degrees removed from that in Figure 1.

The device 16 comprises an outer, relatively rigid cage ring 17 having a plurality of circumferentially spaced openings 18 extending therethrough. An inner, relatively rigid cage ring 19 is also provided through which extend a plurality of circumferentially spaced openings 21. Disposed between the cage rings 17 and 19 is an energizing spring 22 formed of sheet metal with a plurality of circumferentially spaced openings 23 formed therein. Extending respectively through the openings 18, 21 and 23 are a plurality of sprags 24 having eccentrically curved surfaces 25 and 26 respectively adapted to cooperate with the race surfaces 15 and 14 in such a manner that relative rotation of the races in the direction indicated by the arrows in Figure 2 is permitted, while relative rotation of the races in the opposite direction results in the sprags 24 wedgingly coupling the races 2 and 8 together for unitary rotation. It should be noted, as best illustrated in Figure 2, that the spring 22 is provided with integral energizing tabs 27 which respectively engage the sprags 24 and bias them toward their position of initial wedging engagement between the races.

The sprags 24 are so formed that the portions thereof which are disposed within the openings 18 and 21 closely cooperate with the circumferentially facing sides of these openings throughout the tilting range of the sprags 24; that is to say, the circumferentially facing sides of the openings 18 and 21 and the circumferentially facing sides of sprags 24 are complementarily formed so that as the sprags 24 tilt from their overrunning position through their full load position and vice versa, the circumferentially facing sides thereof will remain in engagement with the circumferentially facing sides of the openings within practical manufacturing tolerance limits.

With such an arrangement, tilting movement of any one sprag is transmitted—by virtue of the rigid cage means associated with each of the sprags—to all of the other sprags whereby substantially common angular tilting movement of all of the sprags results. A more complete explanation of a one-way engaging device having the aforementioned characteristics is to be found in the copending application of Harry P. Troendly et al., Serial No. 379,534, filed September 11, 1953, and entitled "One-Way Clutch," now Patent No. 2,824,636, granted February 25, 1958.

Figure 3:
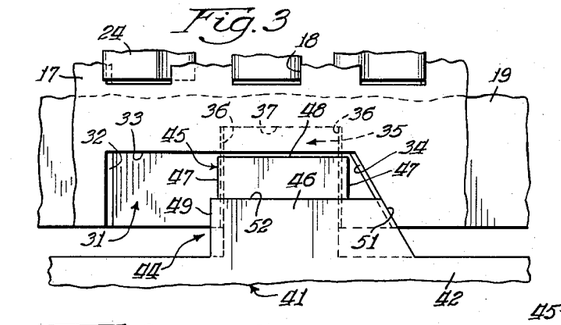
Figure 3 is a sectional view along the plane of line 3—3 of Figure 2.
Figures 5, 6, 7A:
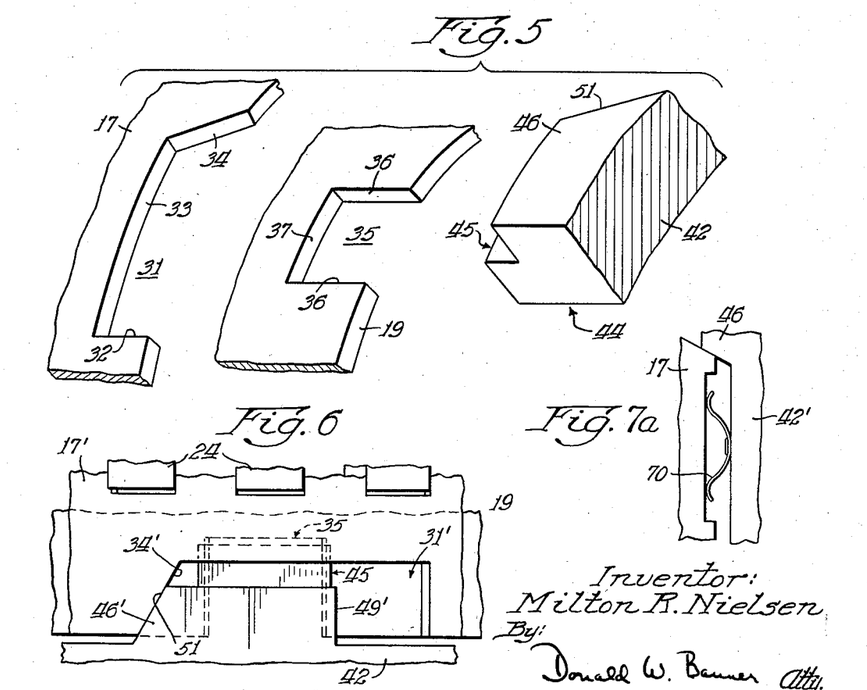
Figure 5 is an exploded view of a portion of the mechanism illustrated in Figures 1 through 3.
Figure 6 is a view similar to Figure 3, but illustrating a first modified form of my invention.
Figure 7a is a sectional view along the plane of line 7a—7a of Figure 7.

The outer and inner cages 17 and 19 respectively of the one-way engaging device 16 are specially formed, as best illustrated in Figures 3 and 5, with cam receiving apertures or openings. Referring first to Figure 5, it will be seen therein that the outer cage 17 is formed to have an axially elongated integral portion in which is located a cam receiving aperture 31 which comprises a generally axially extending edge 32, a generally circumferentially extending edge 33 and an oblique camming edge 34. The inner cage 19 is provided with an opening 35 therein which comprises axially extending spaced edges 36 and a circumferentially extending edge 37 disposed between the edges 36. As best illustrated in Figure 3, the edge 37—which in part defines the opening 35—is spaced axially inwardly of the edge 33 forming a side of the opening 31. In addition, Figure 3 will also clearly show the circumferential extent of the opening 31 to be substantially in excess of that of opening 35.

Figure 4:
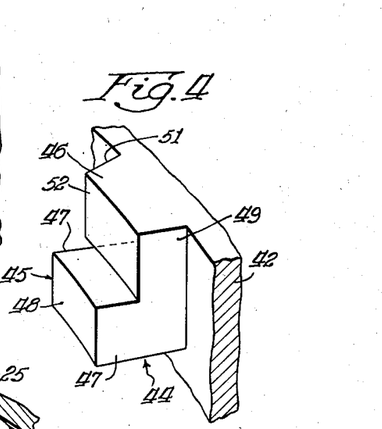
Figure 4 is an enlarged detail view of a portion of the mechanism illustrated in the preceding figures.

Adjacent the clutch member 16 and the inner race member 2 there is provided a control member 41 which comprises a circular plate 42, the outer diameter of which is slightly less than the diameter of the opening defined by the surface 15 on the outer race 8. The plate 42 has a generally circular opening centrally formed therein in which is rotatably disposed a ball thrust bearing 43. As shown in Figure 1, the plunger 5 is biased outwardly by the spring 4 and is received in a cooperating opening in the bearing 43 whereby the plate 42 is normally biased outwardly into engagement with ledge 11. The plate 42 is provided with one or more cam portions 44 (best shown in Figure 4) which comprise a radially inner cam 45 and a radially outer cam 46. The cam 45 comprises axially extending spaced parallel sides 47 and an axially inner circumferentially extending side 48. The cam 46 comprises an axially extending side 49, in reality an extension of one of the sides 47 of the cam 45, and circumferentially spaced from the side 49 is an oblique camming side 51. A circumferentially extending side 52 joins the sides 49 and 51 of the cam 46. As best illustrated in Figure 4, it should be particularly noted that the side 52, while of greater circumferential extent than the side 48, is spaced axially with respect to the side 48. In other words, the side 48 extends axially inwardly toward the one-way engaging device 16 to a greater degree than is the side 52.

In the foregoing description, only one camming section 44 has been described, and only one set of openings in the inner and outer cages have been described; it will be obvious to those skilled in the art that a plurality of such camming sections and cooperating openings in the inner and outer cages may be provided if desired. Preferably, three sets of cooperating camming sections and openings should be provided spaced symmetrically about the clutch.

As best illustrated in Figure 1, the spring 4 biases the plunger 5 outwardly to the right in that figure, so that the plate 42 and the camming sections 44 thereon are disposed in the condition illustrated in that figure, so that the plate 42 and the camming sections 44 thereon are disposed in the condition illustrated in that figure, the outer side of the plate 42 being disposed in slidable engagement with the ledge 11. In this condition, it should be noted that the cam 45 extends into the opening 35 in the inner cage 19 while the cam 46 is spaced axially from the outer cage 17. As a result, the cages 17 and 19 may rotate relatively to each other as the sprags 24 tilt through their tilting range to interconnect and disconnect the races 2 and 8, but the cams 44 are aligned with the cooperating cage openings. In a normal overrunning condition of the unit in which races rotate in the relative direction illustrated by the arrows in Figure 2, the one-way engaging device 16 may tend to rotate, for example, with the outer race 8. It will be obvious that in view of the connection between the cam 45 and the inner cage 19, the plate 42 will rotate with the one-way engaging device 16. It will further be obvious that the engagement between the cam 45 and the opening 35 in the inner cage 19 maintains constant desired alignment of the cam 46 with the opening 31 in the outer cage 17. It will be manifest that the side 34 of the cage 17 is normally so positioned during an overrunning condition of the one-way engaging device with respect to the inner cage 19 that it lies to the left of the position illustrated in Figure 3.

In view of the foregoing construction, when it is necessary or desirable to move the sprags from their normal overrunning condition to one in which the sprags are disengaged from simultaneous engagement with both races—whereupon the races may rotate relatively in either direction without the sprags wedgingly engaging between the races—the control mechanism 41 is moved inwardly, to the left in Figure 1, by suitable means such as a mechanical force. This movement will occur against the bias of spring 4 (as well as spring 22) and will effect the positioning of the plate 42, and the cam sections 44 thereon, which is illustrated in Figure 3. As this inward movement of the plate 42 is initiated the camming surface 51 of the cam 46 engages the surface 34 formed on the outer cage 17. As the cam 44 moves inwardly the camming side 51 engages the oblique side 34 in the cage 17 and effects partial rotation of the outer cage 17 to the right, in Figures 2 and 3, with respect to the inner cage 19. As previously indicated, each of the sprags circumferentially fills the associated openings in both the inner and outer cages; in view of this fact, this movement of the cage 17 to the right with respect to the cage 19 effects simultaneous movement of all of the sprags to a position in which the race engaging surfaces of the sprags can no longer simultaneously engage the associated race surfaces. As long as the plate 42 remains in this inward position the sprags 24 will be maintained in a position such that the races may rotate freely in either direction without effecting wedging of the sprags between the races.

Upon release of the control member 41, the spring 4-plunger 5 combination effects its outward movement. Simultaneously, the spring 22 similarly biases the sprags 24 into a position in which both of the race engaging surfaces thereon are in engagement with their associated races. As a result, relative movement of the cages 17 and 19 occurs which is in a direction such that the plate 42 is cammed outwardly until the cam 46 is disengaged completely from the outer cage 17, cam 45 remaining partially within opening 35. When this occurs, the one-way engaging device 16 once again operates as previously described to wedgingly engage between the races upon their relative rotation in one direction, and to permit their relative rotation in the opposite direction.

Attention is now directed to the modification of the present invention illustrated in Figure 6. This modification is particularly suitable for mechanisms adapted and arranged to maintain the sprags in engagement with both of the races despite any contrary effect of centrifugal force operating upon the sprags. More specifically, during overrunning conditions of a one-way engaging device the sprags may tend to move, under the effect of centrifugal force, to a position in which they disengage one of the associated race surfaces. With the device of the present invention, as illustrated in Figure 6, the one-way engaging device employed will permit the sprags to follow their normal course and lift free of one of the races during most overrunning conditions so that the wear of the sprags and race surfaces is minimized; the present invention, however, provides for selectively maintaining the sprags in engagement with both of the race surfaces despite such effect of centrifugal force when it is desired that they occupy such position. The device of the present invention provides for these advantageous features by modifying the hereinbefore described structure only in the constructions of the outer cage 17' and the cam surface 46'. The inner cage 19 is the same as previously described, and is provided with the before-described opening 35 adapted to receive the cam 45. The ring 42 is modified only in that the construction of the cam 46' is varied as follows. The cam 46' differs from the previously described cam 46 only in that the camming surface 51' provided thereon is formed on the opposite circumferential side from that of the surface 51 on the cam 46. Cam 46' is further defined by an axially extending side 49' which is the same as the side 49 previously described, but on the opposite circumferential side of the cam. The outer cage 17' is correspondingly modified so as to be formed with a camming surface 34'—comparable to the camming surface 34, but on the opposite circumferential side of the opening 31' formed in the outer cage 17.

It will be manifest to those skilled in the art from the foregoing description of Figure 6 and the previous description of the device illustrated in Figures 1 through 5 that upon axially inward movement of the ring 42 (during overrunning) the cam 46' of Figure 6 will cooperate with the camming side 34' in the outer cage 17 in such a manner to effect relative positioning between the cages 19 and 17' such that the sprags 24 will tend to be rotated in a counterclockwise direction from the view of Figure 2. In other words, the sprags 24 will be so positioned by the relative movement of the cages 19 and 17' when the ring 42 is moved axially inwardly that both of the race engaging surfaces 25 and 26 of the sprags 24 will be so positioned by the relative movement of the cages 19 and 17' when the ring 42 is moved axially inwardly that both of the race engaging surfaces 25 and 26 of the sprags 24 will be maintained in engagement with the respective race surfaces 15 and 14. As a result, as soon as the races 2 and 8 rotate relatively in a lock-up direction, the sprags will immediately engage therebetween to effect unitary rotation of the races in the well-known manner. When the force effecting axial inward movement of the cage 42 is released, as previously described, the spring 4-piston 5 combination will effect outward axial movement of the cage 42 to move cam 46' axially outwardly of the cage 17', and break all connection therebetween; as previously described, the cam 45 will remain partially within the opening 35 in the cage 19 to maintain registry of the cams and the cage openings while relative rotation between the cages 17' and 19 is permitted in the normal manner. It will be manifest to those skilled in the art that while the foregoing description has been of a single pair of cams 45 and 46' and a single pair of associated openings 35 and 31', a plurality of such cam-opening constructions may be provided.

Turning now to a consideration of Figure 7, there is disclosed therein a modified form of the invention illustrated in Figures 1 through 5. In this figure, there is disclosed an inner race 61 having a cylindrical outer surface 62. An outer race 63 is provided having an inner cylindrical surface 64, the surfaces 62 and 64 being maintained properly separated by suitable bearing means indicated at 65. Disposed between the surfaces 62 and 64 is the one-way engaging device 16 previously described. Associated therewith is a ring 42' which differs from the ring 42 by having a larger centrally disposed circular opening therein of such nature as to embrace the surface 62 of the inner race 61 as illustrated. That figure also discloses that the outer surface of the ring 42' is also cylindrical in contour and embraces the surface 64 of the race 63, suitable sealing means being provided in the ring 42' and in the inner race 61—as illustrated—to prevent the flow of fluid between the ring 42' and the associated inner race surface. The outer race 63 is provided with an inwardly projecting circular ledge 66, the interior portion of which is complementary to the surface 62 of the inner race 61; as illustrated in Figure 7, suitable sealing means are provided to prevent the flow of fluid outwardly past the ledge 66. The inner race 61 has formed therein a generally L-shaped channel 67, one end of which is in communication with the generally circular opening 68 formed between the ring 42' and the ledge 66. Suitable means (not shown) are provided for controlling the flow of fluid under pressure through the channel 67 and into the opening 68. The ring 42' carries a plurality of leaf springs 70 adapted thereto by suitable means which extend into notches in the outer cage to bias ring 42' outwardly. It will be apparent to those skilled in the art that when fluid under pressure is forced through channel 67 and into opening 68, the ring 42' is forced axially inwardly toward the one-way engaging device 16, as shown in Figure 7. This will effect relative rotation of the outer and inner cages 17 and 19, respectively, of the one-way engaging device in the manner previously described in detail with respect to the structure illustrated in Figures 1 through 5. In this condition, the sprags 24 are prevented from simultaneously engaging both of the race surfaces 62 and 64 so that wedging engagement thereof is precluded. Upon venting of the fluid under pressure in the opening 68 and the channel 67, springs 70 will force ring 42' outwardly so that cam 46 is axially spaced outwardly of the outer cage 17. Spring 22 will force the sprags 24 back into engagement with the race surfaces so that the one-way engaging device 16 will again operate in a normal manner.

Figure 8:
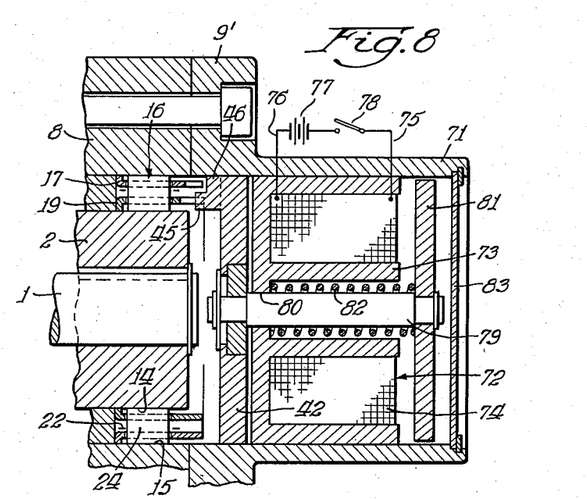
Figure 8 is a view similar to Figures 1 and 7 illustrating another modified form of my invention.

Attention is now directed to the embodiment of the present invention illustrated in Figure 8 in which there is disclosed the outer race 8 and the inner race 2, the latter, as previously described, being keyed to a suitable shaft 1. The races 2 and 8 respectively provide spaced cylindrical surfaces 14 and 15 between which is disposed the one-way engaging device 16, previously described. The cap member 9' associated in fixed relationship with the outer race 8, is provided with an elongated annular wall 71 which serves as a housing for an electro-magnet 72. This electro-magnet comprises a generally E-shaped (in cross-section) core 73 of magnetic material within which are disposed suitable electrical windings 74, having leads 75 and 76 projecting outwardly therefrom and extending outwardly through wall 71. Serially disposed between the ends of the leads 75 and 76 is a suitable source of electrical energy, illustrated as a battery 77, and normally an open switch 78. Extending axially through the magnet 72 is an armature 79 of magnetic material, the outer portion of which is fixedly attached to a circular cap 81 disposed within the wall 71, the outer diameter of the cap 81 being smaller than the interior diameter of the wall 71. Interposed between the inner wall of the core 73 and the cap 81 is a spring 82 which serves to bias the armature 79 outwardly (to the right in Figure 8). The inner end of the armature 79 projects rotatatively through a suitable opening 80 in the inner wall of core 73 and is fixedly attached to the previously described plate 42. A cover member 83 is provided in the outer extremity of the wall 71 to suitably close the chamber formed by that wall.

With the condition of the parts illustrated in Figure 8, the one-way engaging device 16 will operate as usual to connect the races 2 and 8 during the relative rotation thereof in one direction, and to permit the opposite relative rotation of the races. With the one-way engaging device 16 in its overrunning condition, if it is desired to effect movement of the sprags 24 to a position in which the opposite ends thereof do not simultaneously contact both of the races, the switch 78 may be closed to effect an energization of the winding 74. The armature 79 will thereupon be drawn inwardly, to the left in Figure 8, against the bias of the spring 82. Inward movement of the armature 79 effects simultaneously inward movement of the plate 42 and the cams 45 and 46 thereon. As previously described with respect to the device illustrated in Figure 1, this effects relative positioning of the cages 17 and 19 in such manner that the sprags 24 are moved so that the race engaging surfaces thereon no longer simultaneously contact the inner and outer races. As a result, the races may rotate relatively to each other freely in both relative directions of rotation. When it is desired to restore the one-way engaging device 16 to its normal condition, the switch 78 may be opened so as to effect a deenergization of the windings 74. The spring 22 of the one-way engaging device and the spring 82 will thereby simultaneously effect movement of the plate 42 back to the position illustrated in Figure 8 in which the cam 46 no longer contacts the outer cage 17. The sprags 24 will, therefore, once again operate in the normal manner, being once again simultaneously in engagement with both the inner and outer races.

Figure 9:
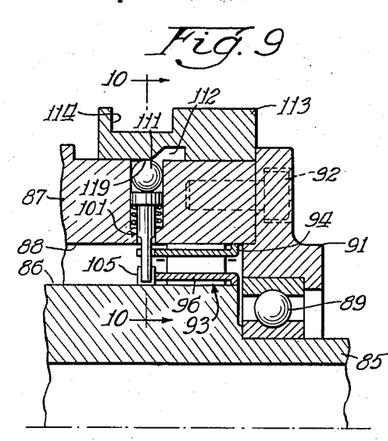
Figure 9 is a partial side elevational view, partially in section, illustrating another modified form of my invention.
Figure 10:
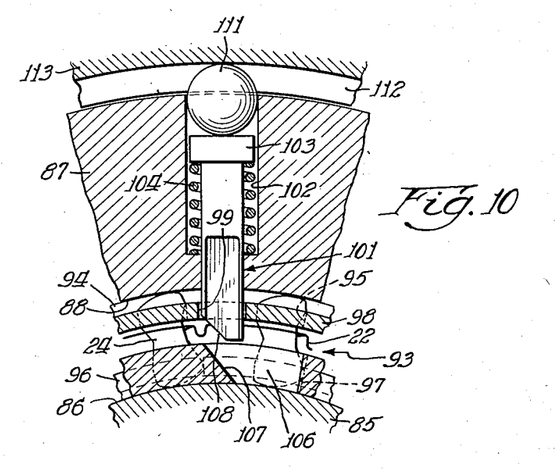
Figure 10 is an enlarged view along the plane of line 10—10 of Figure 9.
Figure 11:
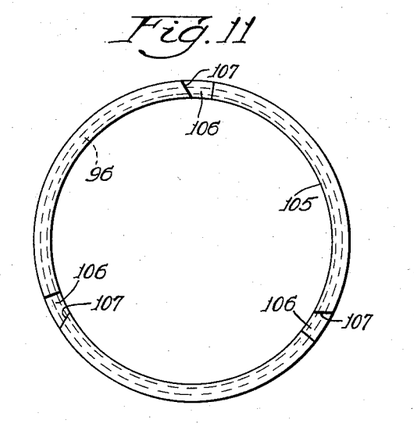
Figure 11 is an enlarged view of a portion of the mechanism illustrated in Figures 9 and 10.

Discussing the embodiment of the present invention illustrated in Figures 9 through 12, there is shown therein a shaft 85 having an outer cylindrical surface portion 86. Disposed about the shaft 85 is an outer race member 87 having a cylindrical inner surface 88. The member 87 is maintained in position on the shaft 85 by means of suitable bearings 89, disposed between the shaft 85 and a ring 91 which is connected by suitable bolts 92 to the outer race member 87. Disposed between the races 86 and 88 and adapted to wedgingly engage between these surfaces during relative rotation thereof in one direction only is a one-way engaging device, indicated generally by the numeral 93, which is substantially the same as the one-way engaging device 16. The device 93 comprises an outer cylindrical cage 94 having a plurality of circumferentially spaced openings 95 therein, and an inner cylindrical cage 96 having a plurality of circumferentially spaced openings 97 therein, sprags 24 being disposed in and extending through the openings 95 and 97. The openings and sprags are constructed so as to remain in engagement throughout the sprag tilting range. A spring 22 is provided which, as previously described, biases the sprags 24 to their position of initial engagement with the race surfaces 86 and 88. The outer cage 94 has an elongated inner portion 98 in which are provided a plurality of openings 99 symmetrically spaced about the ring 94. The openings 99, as best illustrated in Figure 9, are of limited axial extent, each of the openings 99—as best shown in Figure 10—normally slidably receiving the inner end of a plunger 101, the main portion of which is disposed within one of a plurality of suitable openings 102 in the outer race 87. The plunger 101 is provided with a head portion 103 and the opening 102 is provided with an enlarged upper portion which also receives a spring 104 disposed between the head 103 of the plunger 101 and an inner surface of the enlarged portion of the opening 102.

The inner cage 96 of the one-way engaging device 93 is provided with an enlarged end ring 105 integral therewith. The ring 105 is provided with a plurality of symmetrically spaced openings 106 corresponding in number to openings 99 each of which is formed with at least one side 107 which is disposed at an angle with respect to radial lines drawn through the one-way engaging device 93. As best shown in Figure 9, the axial extent of the openings 106 in the ring 105 is substantially the same as the axial extent of the openings 99 in the cage 94.

Figure 12:
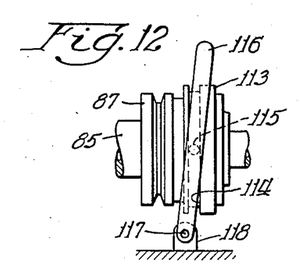
Figure 12 is a view illustrating the operating means for effecting operation of the embodiment of my invention illustrated in Figure 9.

As illustrated in Figure 10, the innermost end of the plunger 101 is formed with a tapered side 108 which, during the normal overrunning condition of the one-way engaging device 93 (illustrated in Figure 10), is located in radial alignment with one of the sides 107 of the openings 106. As a result, upon radial movement of the plunger 101 inwardly during the overrunning condition of the device 93, the side 108 will engage the side 107 aligned therewith and will effect relative positioning of the cages 94 and 96 such that the sprags 24 are rotated to a position in which they can no longer simultaneously engage both the race surfaces 86 and 88. As a result, the races 85 and 87 may rotate relatively in either direction. To effect this radial movement of the plunger 101 there is provided in each of the openings 102 a ball 111 disposed in engagement with the head 103 of the plunger 101. The outermost portion of the ball 111 is normally disposed in an annular trough 112 formed in a ring-like collar 113 disposed about the outer race 87 and shiftable axially thereon within predetermined limits, as illustrated in Figure 9. The collar 113 is also provided with an annular exterior groove 114 adapted to receive a radially extending arm 115 which is fixedly mounted on a lever 116. The lever 116, as shown in Figure 12, is pivoted at 117 to a fixed bracket 118 so that rotative motion of the lever 116 about its pivot 117 effects axial movement of the collar 113. As a result, the ball 111 will either extend outwardly into the trough 112 or it will be forced axially inwardly—as shown in Figure 9—by the innermost surface 119 of the collar 113. When the collar 113 is positioned as illustrated in Figure 9, the ball 111 has been forced radially inwardly within the opening 102, against the bias of spring 104, and has forced plunger 101 radially inwardly to effect the relative positioning of the cages 94 and 96 previously described in which case the races 85 and 87 may rotate relatively to each other in either direction without the sprags 24 wedgingly engaging therebetween. When collar 113 is moved away from the position illustrated in Figure 9 so that the ball 111 may move upwardly into the trough 112, spring 104 will be permitted to expand and will lift plunger 101 and the ball 111 to the position illustrated in Figure 10. In this position the one-way engaging device 93 will again operate in its normal manner to connect the races together for unitary rotation upon attempted relative rotation thereof in one direction, and will permit relative free rotation of the races in the opposite direction.

Attention is now directed to the embodiment of the present invention illustrated in Figures 13 through 16. In these figures, there is disclosed a shaft 121 to which there is keyed an inner race 122 having an outer cylindrical surface 123. Spaced from the shaft 121 by suitable bearing means 124 is an outer race 125 having a cylindrical surface portion 126. Disposed between the surfaces 123 and 126 is a one-way engaging device 127 (similar to device 16) comprising an outer cage 128 having a plurality of circumferentially spaced openings 129. The device 127 further comprises an inner cage 131 having a plurality of circumferentially spaced openings 132, sprags 24 being provided which extend through the openings 129 and 132. As previously described with respect to the other embodiments of this invention, the openings 129 and 132 and the sprags 24 are so constructed that the circumferentially facing sides of the sprags remain in engagement with the circumferentially facing sides of the openings throughout the tilting range of the sprags. A spring 22, previously described, is provided for energizing the sprags. Cage 128 is formed with two integral, circumferentially spaced tabs 133, and cage 131 is provided with two integral, circumferentially spaced tabs 134. The tabs 133 are received in suitable arcuate openings 135 formed in the outer race 125, the circumferential extent of the openings 135 being substantially the same as the circumferential extent of the tabs 133 whereby the outer cage 128 will be fixed to the outer race 125. In projecting into the notches 135, the tabs 133 extend through suitable slots 136 formed in the periphery of a generally circular actuator plate 137 which has a circular opening 137' centrally located therein through which the shaft 121 extends. The slots 136 having a circumferential dimension which is substantially in excess of that of tabs 133.

The plate 137 is further provided with a pair of circumferentially spaced arcuate slots 138 spaced 90 degrees from slots 136 in which are disposed the tabs 134 formed on the inner cage 131. The circumferential extent of the tabs 134 and the notches 138 is substantially the same whereupon the rotation of the plate 137 will effect rotation of the cage 131.

Figures 13, 14:
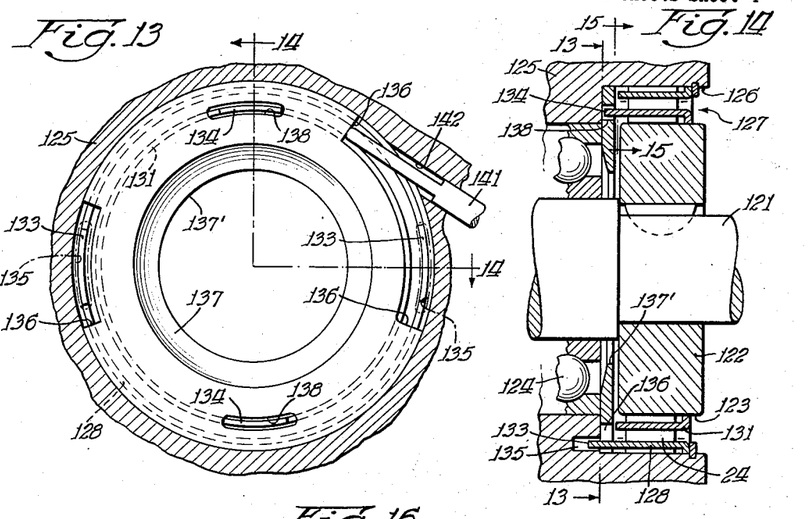
Figure 13 is an end elevational view of another embodiment of my invention.
Figure 14 is an enlarged sectional view along the plane of line 14—14 of Figure 13.
Figure 15:
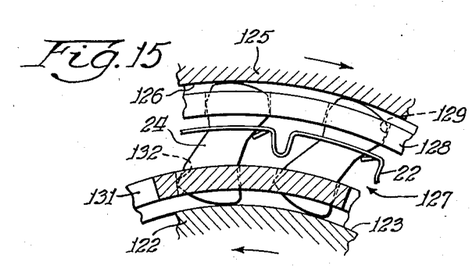
Figure 15 is an enlarged sectional view along the plane of line 15—15 of Figure 14.
Figure 16:
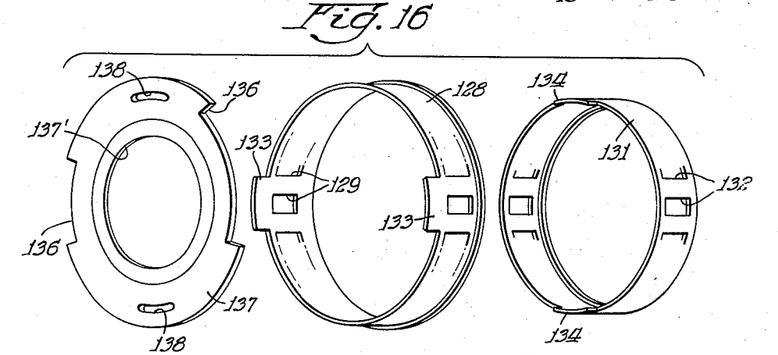
Figure 16 is an exploded view of a portion of the mechanism illustrated in Figures 13 and 14.

Means are provided for effecting rotative movement of the plates 137, these means comprising a plunger 141. The plunger 141 extends through a suitable tangential slot 142 in the outer race 125 aligned with and in the plane of the plate 137. Suitable means, such as an electromagnet and spring arrangement (not shown) are provided in the outer race 125 for effecting reciprocation of the plunger 141 in the slot 142. The electro-magnet may be energized by slip rings on the outer race in a conventional manner. The specific manner of mounting the electromagnet and energizing the same are deemed conventional and forms no part of the present invention. As illustrated in Figure 13 inward movement of the plunger 141 causes the innermost ends thereof to engage the associated side of one of the slots 136 and effects peripheral rotation of the plate 137. This rotation is imparted to the inner cage 131 by virtue of the slots 138-tabs 134 connection, whereby the cage 131 is rotated to a position such that the sprags can no longer simultaneously contact both the inner and outer race surfaces. As a result, the races may rotate relatively to each other in either direction freely. Upon deenergization of the electro-magnet and return of the plunger 141 by means of the spring, the spring 22 will force the sprags 24 back into their normal free wheeling position in which they contact both the race surfaces 123 and 126 so that upon relative rotation of the races in the "locked-up" direction, the sprags will once again wedge therebetween to effect the unitary rotation of both of the races.

It will, therefore, be seen from the foregoing description that the present invention provides new and improved control means which are relatively simple and economical, but efficient and positive acting. In each of the embodiments of the invention described, a one-way engaging device has been employed which is of the "full-phasing type," more fully described in the copending patent application of Harry P. Troendly, Serial No. 379,534, filed September 11, 1953, and entitled "One-Way Clutch." By employing such a mechanism—in which the sprags and rectangular cage openings are constructed so that the sprags contact the circumferentially facing sides of the openings throughout substantially the entire tilting range of the sprags—tilting movement of any one sprag is transmitted through the cages to each of the other sprags so that substantially common angular tilting of all of the sprags occurs. Conversely, relative rotation of the cages effects substantially immediate and simultaneous movement of all of the sprags. As a result, when the camming means employed in this invention effect relative movement between the cages, the sprags are immediately and positively moved (or maintained) in desired relationship with the associated race surfaces. It will furthermore be seen that the modification of the invention illustrated in Figure 6, which has been described only as a modification of the structure illustrated in Figures 1 through 5, could be employed with any of the other modifications of the invention illustrated. In addition, it will further be obvious that the actuating means for moving the camming means may be mechanical, electrical, fluid, thermal or otherwise responsive. It should furthermore be noted particularly that the present invention provides a control mechanism suitable for disposition between the annular opening defined by race surfaces without substantial modification of the race surfaces, either structurally or dimensionally. The present invention is also advantageous in that its employment with standard commercial one-way engaging devices may be effected with only minor changes in the one-way engaging device per se.

While certain preferred embodiments of the invention have been specifically disclosed, it is understood that the invention is not limited thereto, as many variations will be readily apparent to those skilled in the art and the invention is to be given its broadest possible interpretation within the terms of the following claims

I claim:

1. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, and camming means selectively operative during overrunning conditions of said device including means movable relative to both of said cages constructed and arranged to effect desired relative positioning of said cages and consequent desired positioning of said sprags relative to said cylindrical surfaces.

2. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, and camming means selectively operative during overrunning conditions of said device including means movable radially relative to at least one of said cages and constructed and arranged to effect desired relative positioning of said cages and consequent desired positioning of said sprags relative to said cylindrical surfaces.

3. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, and camming means selectively operative during overrunning conditions of said device including rotatable means movable to rotate one of said cages relative to the other to effect desired relative positioning of said cages and consequent desired positioning of said sprags relative to said cylindrical surfaces.

4. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, and camming means selectively operative during overrunning conditions of said device including means movable radially relative to at least one of said cages and means on the other of said cages adapted to cooperate with said last-mentioned means to maintain desired alignment of said last-mentioned means and said cages.

5. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, means on one of said cages defining at least one axially extending aperture therein having relatively axially extending sides, means on the other of said cages defining at least one axially extending aperture therein having at least one angularly disposed side, a cam member disposed between said cylindrical surfaces including a first projection disposed within said one cage aperture and a second projection adapted to selectively engage and disengage said angularly disposed side of said other cage aperture during overrunning conditions of said device to effect desired relative positioning of said cages.

6. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, means on one of said cages defining at least one axially extending aperture therein having relatively axially extending sides, means on the other of said cages defining at least one axially extending aperture therein having at least one angularly disposed side, a cam member disposed between said cylindrical surfaces including a first projection disposed within said one cage aperture and a second projection adapted to selectively engage and disengage said angularly disposed side of said other cage aperture during overrunning conditions of said device to effect desired relative positioning of said cages, means adapted to bias said cam member to a position in which said second projection is disengaged from said angularly disposed side of said other cage aperture, and means for effecting movement of said cam member against said bias.

7. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, means on one of said cages defining at least one aperture therein, means on the other of said cages defining at least one aperture therein having a side disposed angularly with respect to the axis of said one-way engaging device, means defining a radially extending slot in one of said races, a plunger disposed in said slot for radial movement therein and including a portion normally extending into said aperture in said one cage whereby said one cage and said one race rotate together, means defining a camming portion on said plunger adapted during overrunning conditions of said device to engage said angularly disposed side of said aperture in said other cage to effect desired relative positioning of said cages, means biasing said plunger to a position in which said plunger is disengaged from said other cage, and means for moving said plunger against said bias.

8. In a control mechanism, the combination comprising an outer and an inner race having spaced cylindrical surfaces which together define an annular opening therebetween, a one-way engaging device disposed in said opening comprising an outer generally annular cage and an inner generally annular cage rotatable relative to said outer cage, means defining a plurality of circumferentially spaced openings in said cages, a plurality of tiltable sprags respectively disposed within said openings and constructed with race engaging surfaces at opposite ends thereof normally in engagement with both of said cylindrical surfaces adapted to effect wedging engagement of the sprags between the races upon relative rotation of the races in one direction and to permit relative rotation of the races in the opposite direction, axially extending tab means on one of said cages, axially extending tab means on the other of said cages, slot defining means in one of said races closely receiving said axially extending tab means on said one cage whereby said one cage and one race rotate together unitarily, and a rotatable plate adjacent said one-way engaging device including slot means closely receiving said tab means on said other cage whereby rotation of said plate effects desired relative positioning of said cages.

References Cited in the file of this patent

UNITED STATES PATENTS

| | | |
|---|---|---|
| 554,486 | Geb | Feb. 11, 1896 |
| 2,089,846 | Finch | Aug. 10, 1937 |
| 2,113,722 | Dodge | Apr. 12, 1938 |
| 2,404,221 | Dodge | July 16, 1946 |
| 2,428,968 | Gruenberg | Oct. 14, 1947 |
| 2,683,509 | Jandasek | July 13, 1954 |
| 2,721,638 | Palm | Oct. 25, 1955 |
| 2,824,636 | Troendly et al. | Feb. 25, 1958 |